United States Patent
Castle et al.

(10) Patent No.: US 10,794,459 B1
(45) Date of Patent: Oct. 6, 2020

(54) HYDROSTATIC TRANSMISSION

(71) Applicant: Parker-Hannifin Corporation, Cleveland, OH (US)

(72) Inventors: Thomas K. Castle, Morristown, TN (US); Jason S. Richardson, Chuckey, TN (US); Kyle L. Merrill, Chuckey, TN (US); Steve Finkner, Cleveland, OH (US); Jeremy Tate, Cleaveland, OH (US); Kenneth T. Gilbert, Bristol, TN (US); Imam Nabil, Louisville, KY (US); Robert Manbert, Savannah, GA (US); James R. Lenz, Bristol, TN (US); David M. Heathcoat, Cleveland, OH (US)

( * ) Notice: Subject to any disclaimer, the term of this patent is extended or adjusted under 35 U.S.C. 154(b) by 0 days.

(21) Appl. No.: 16/400,187

(22) Filed: May 1, 2019

Related U.S. Application Data

(60) Provisional application No. 62/665,666, filed on May 2, 2018.

(51) Int. Cl.
  *F16H 39/42* (2006.01)
  *F16D 39/00* (2006.01)
  *F16H 39/14* (2006.01)

(52) U.S. Cl.
  CPC ............ *F16H 39/42* (2013.01); *F16D 39/00* (2013.01); *F16H 39/14* (2013.01)

(58) Field of Classification Search
  CPC ..... F16H 39/14; F16H 39/42; B60K 17/0015; B60K 17/043; B60K 17/356
  USPC .................................................. 60/487; 180/308
  See application file for complete search history.

(56) References Cited

U.S. PATENT DOCUMENTS

| | | | |
|---|---|---|---|
| 2,718,758 A * | 9/1955 | Minshall | F16H 39/42 60/489 |
| 3,199,297 A | 8/1965 | Croswhite | |
| 5,992,150 A | 11/1999 | Eberle | |
| 6,477,838 B1 | 11/2002 | Thoma et al. | |
| 6,550,243 B2 | 4/2003 | Hauser et al. | |
| 7,614,227 B2 * | 11/2009 | Carlson | F16H 61/40 60/487 |
| 8,635,867 B2 * | 1/2014 | Dong | F16H 39/42 60/487 |
| 9,151,374 B2 * | 10/2015 | Richardson | F16H 39/04 |
| 9,260,006 B2 * | 2/2016 | Crosby | B60K 7/0015 |
| 9,664,270 B1 * | 5/2017 | Langenfeld | F16H 39/42 |
| 2005/0217919 A1 | 10/2005 | Okada et al. | |

* cited by examiner

*Primary Examiner* — Michael Leslie
(74) *Attorney, Agent, or Firm* — McDonnell Boehnen Hulbert & Berghoff LLP

(57) ABSTRACT

An example hydrostatic transmission includes (i) a motor section having a motor interface; (ii) a pump section configured to generate fluid flow, where the pump section comprises a pump interface having a first pump port to provide fluid flow therethrough and a second pump port to receive returning fluid flow therethrough; and (iii) an interface block coupled to the motor interface and coupled to the pump interface so as to couple the pump section to the motor section, where the interface block includes internal fluid passage to facilitate fluid communication between the pump section and the motor section.

20 Claims, 9 Drawing Sheets

HYDROSTATIC TRANSMISSION

CROSS REFERENCE TO RELATED APPLICATION

The present application claims priority to U.S. Provisional patent application Ser. No. 62/665,666, filed on May 2, 2018, and entitled "Hydrostatic Transmission," the entire contents of which are herein incorporated by reference as if fully set forth in this description.

BACKGROUND

The term "transmission" may refer generally to systems that provide speed and torque conversions from a rotating power source to another rotary or linear device. Hydrostatic transmission is a category of transmissions that includes a system in which power is generated and transmitted by pressurizing and releasing fluid through pumps and motors. The system works by converting energy harnessed from the movement of fluid through hydraulic pumps and motors to drive an axle of a vehicle. A hydrostatic transmission can be used to power many types of machines such as tractors, backhoes, and turf equipment, for example. A hydrostatic transmission is characterized in providing high power in a small duration of time.

SUMMARY

The present disclosure describes implementations that relate to a hydrostatic transmission. In an example implementation, the present disclosure describes a hydrostatic transmission including: (i) a motor section having a motor interface; (ii) a pump section configured to generate fluid flow, where the pump section comprises a pump interface having a first pump port to provide fluid flow therethrough and a second pump port to receive returning fluid flow therethrough; and (iii) an interface block coupled to the motor interface and coupled to the pump interface so as to couple the pump section to the motor section.

The interface block includes: (i) a pump-side interface configured to mate with the pump interface, where the pump-side interface comprises: a first port fluidly coupled to the first pump port and a second port fluidly coupled to the second pump port; (ii) a motor-side interface configured to mate with the motor interface of the motor section, where the motor-side interface comprises a first opening configured to provide fluid to the motor section and a second opening configured to receive fluid returning from the motor section; (iii) a first internal fluid passage configured to fluidly couple the first port to the first opening; and (iv) a second internal fluid passage configured to fluidly couple the second opening to the second port.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

An example hydrostatic transmission can include a piston-type variable displacement hydraulic pump and a hydraulic motor. The transmission may include a reservoir, a pump section, a motor section, an end-block, and a motor housing. The end block can be configured to transmit fluid power from the pump section to the motor section, and the motor housing can be configured to mount the hydraulic transmission to a frame of a vehicle.

The pump section houses a displacement control mechanism or swash mechanism configured to control the flow of fluid generated by the pump. Example swash mechanisms may include a trunnion-mounted swash.

Figure 1:
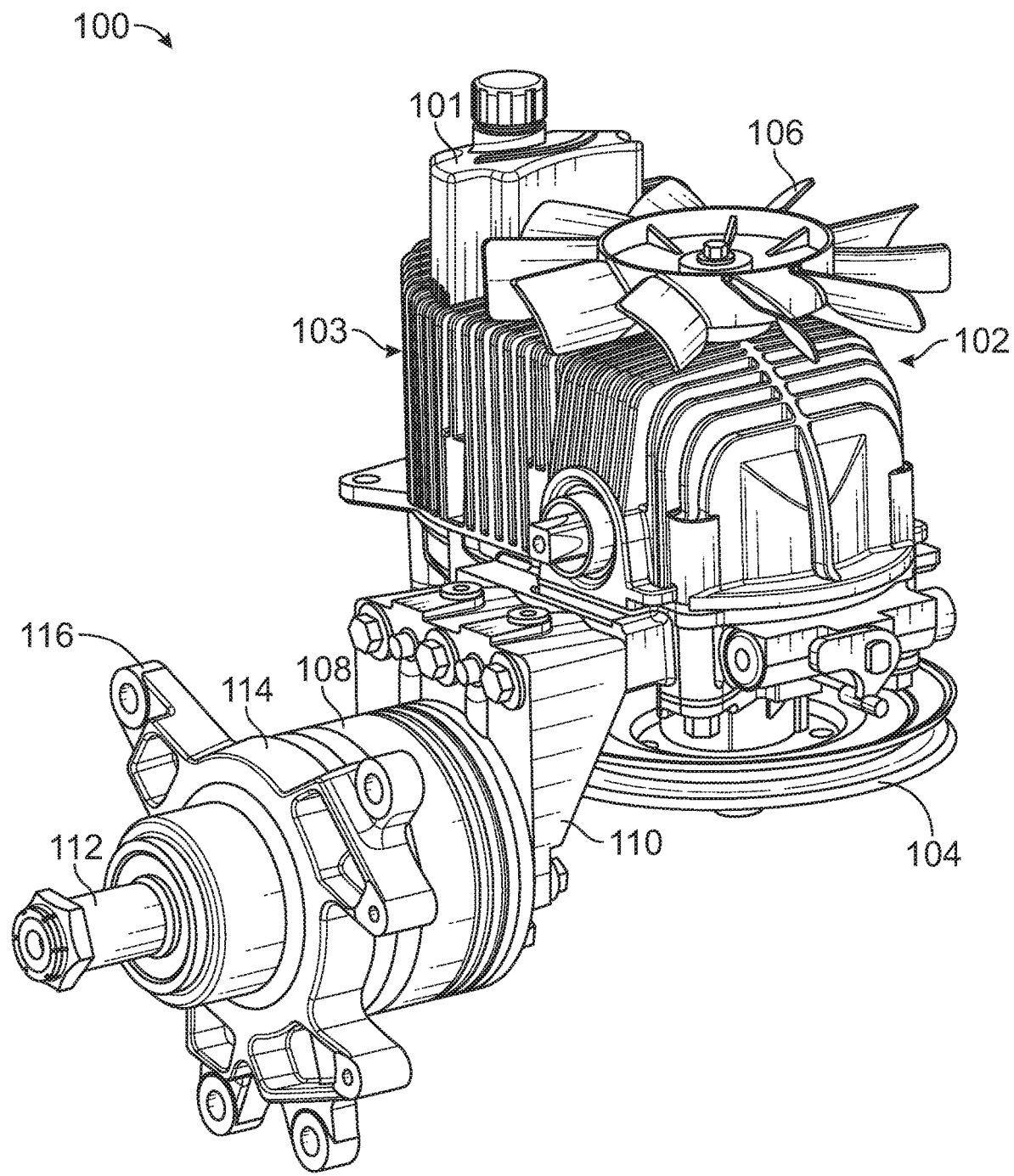
FIG. 1 illustrates a perspective view of a hydrostatic transmission, in accordance with an example implementation.

FIG. 1 illustrates a perspective view of a hydrostatic transmission 100, in accordance with an example implementation. The hydrostatic transmission 100 includes a reservoir 101 configured to contain hydraulic oil at a low pressure, e.g., 0-70 pounds per square inch (psi).

The hydrostatic transmission 100 includes a pump section 102 for generating pressurized fluid. The pump section 102 has a housing 103 configured to contain or house the components of the pump section 102. The reservoir 101 is integrated with, coupled to, or formed as a portion of the housing 103.

The hydrostatic transmission 100 includes houses a shaft (e.g., input shaft 508 described below and shown in FIG. 5) that runs through the pump section 102 and coupled to a rotating group of components within the pump section 102 as described below. The shaft is coupled to a pulley 104 as shown in FIG. 1. A belt or chain can rotatably couple the pulley 104 to a prime over (e.g., an engine of a mobile machine such as a lawn mower). As such, the prime mover causes the pulley 104 and the shaft coupled thereto to rotate. A fan 106 is mounted to the shaft at an opposite side of the pump section 102 compared to the pulley 104 as shown in FIG. 1. As the pulley 104 and the shaft rotate, the fan 106 also rotates, thereby providing cooling air that facilitates cooling or reducing the temperature of the housing 103 as air from the fan 106 blows about the housing 103. The housing 103 can be with fins to facilitate heat transfer therefrom.

The hydrostatic transmission 100 further includes a motor section 108 having a hydraulic motor rotatable by the fluid provided by the pump section 102. An interface block 110 is disposed between the pump section 102 and the motor section 108. The interface block 110 can also be referred to as an end block or end cover. The interface block 110 is configured to provide flow paths from the pump section 102 to the motor section 108 and back from the motor section 108 to the pump section 102, and then to the reservoir 101.

The motor section 108 includes a rotating group of components that rotates as pressurized fluid is provided from the pump section 102 and flows through the motor section 108. For example, the motor section 108 can have pistons disposed in a piston block and interface with a tilted swash plate. Due to the tilted swash plate being tilted, as pressurized fluid is drawn into the motor section 108 through the interface block 110, the pistons reciprocate and rotate with the piston block. A shaft 112 can be rotatably coupled to the piston block such that as the piston block rotates, the shaft 112 rotates as well. The shaft 112 can, for example, be coupled to a wheel of a vehicle or a disk coupled to the wheel. With this configuration, as the shaft 112 rotates, the disk and wheel rotate, thereby propelling the vehicle.

The hydrostatic transmission 100 can be mounted to a frame of the vehicle. As the shaft 112 rotates, it applies a torque on the wheel to rotate the wheel and propel the vehicle. The vehicle and the wheel in turn apply a resistive reaction torque that is transferred from the vehicle to the hydrostatic transmission 100.

In conventional hydrostatic transmission configuration, a separate bracket can be mounted or installed to a motor housing of a hydrostatic transmission. The torque applied by the motor is transferred from the motor housing to the separate bracket into the frame of the vehicle. The reaction torque of the vehicle is transferred via a reverse path from the frame to the separate bracket to the motor housing. Further, in example conventional hydrostatic transmissions, the separate bracket is mounted to the frame of the vehicle via three fasteners passing through three holes in the separate bracket and corresponding holes in the frame. Such a configuration can cause each fastener to carry a heavy load.

The configuration of the hydrostatic transmission 100 shown in FIG. 1 can eliminate the need for the separate bracket and can cause the torque to be distributed among a larger number of fasteners. Particularly, the motor section 108 includes a motor housing 114. The motor housing 114 has a mounting flange 116 that is configured to be coupled to the frame of the vehicle to mount the hydrostatic transmission 100 to the vehicle. The mounting flange 116 has a mounting pattern with several holes to allow fasteners to couple the hydrostatic transmission 100 to the vehicle. The mounting flange 116 is integrated with the motor housing 114 of the motor section 108. In other words, the motor housing 114 and the mounting flange 116 can be a single component, e.g., can be cast as a single component, and therefore this configuration can eliminates the need for a separate bracket that couples the motor section 108 to the frame of the vehicle.

Figure 2:
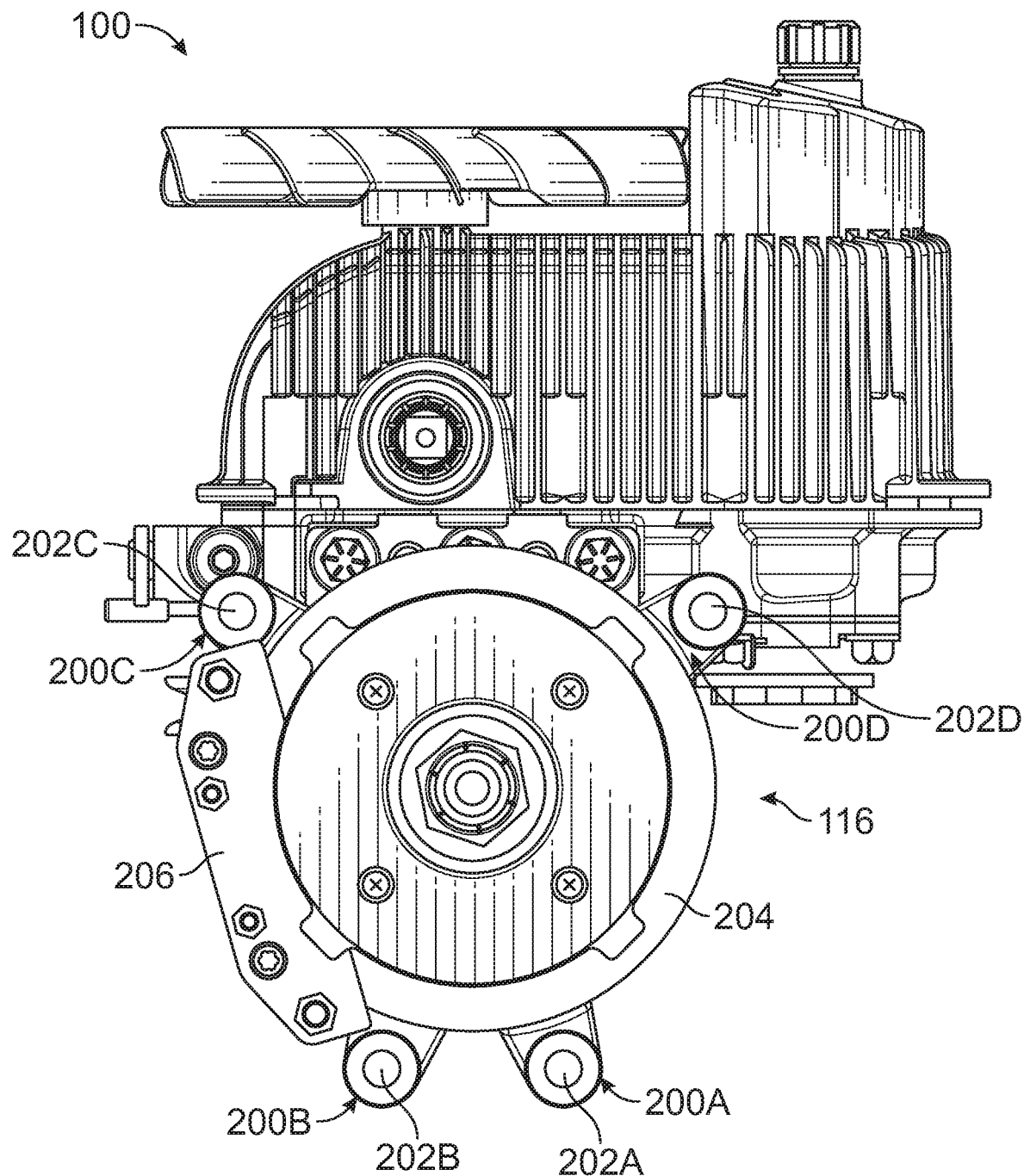
FIG. 2 illustrates a side view of the hydrostatic transmission shown in FIG. 1, in accordance with an example implementation.

FIG. 2 illustrates a side view of the hydrostatic transmission 100, in accordance with an example implementation. As depicted in FIG. 2, the mounting flange 116 includes a plurality of mounting plates or mounting "ears" such as four mounting ears 200A, 200B, 200C, and 200D that protrude radially outward. Each mounting ear 200A-200D has a hole. Particularly, the mounting ear 200A has a hole 202A, the mounting ear 200B has a hole 202B, the mounting ear 200C has a hole 202C, and the mounting ear 200D has a hole 202D. The holes 202A-202D accommodate or receive fasteners that couple the hydrostatic transmission 100 to the frame of the vehicle. The number and configuration of the mounting ears 200A-200D facilitate spreading the torque or vehicle load across more fasteners than conventional configurations described above. Thus, each fastener can carry less load, and the reliability of the hydrostatic transmission 100 can increase.

As shown in FIG. 2, the hydrostatic transmission 100 can be coupled to a disk 204 that can then be coupled to the wheel of the vehicle. Particularly, the shaft 112 can be coupled (e.g., via a spline configuration) to the disk 204 such that, as the shaft 112 rotates, the disk 204 also rotates therewith, thereby rotating the wheel of the vehicle and propelling the vehicle. To brake or slow down the vehicle, brake calipers, such as brake caliper 206, are mounted to the disk 204, and actuation of the brakes of the vehicle cause the brake calipers to move and squeeze a pair of pads against the disk 204 to generate friction therebetween, causing the disk 204 and the wheel to slow down.

In conventional hydrostatic transmissions, a brake bracket is attached to a motor housing of a hydrostatic transmission, and calipers are then mounted to the brake bracket. For instance, bolts can be used to mount the brake bracket to the motor housing, and the brake bracket may have holes through which fasteners can be used to couple the calipers to the brake bracket. With the configuration of the hydrostatic transmission 100, however, attachment points of the calipers are cast directly into the motor housing 114, and particularly cast as part of the mounting flange 116. This way, an extra brake bracket as used in conventional hydrostatic transmissions is eliminated.

Figure 3A:
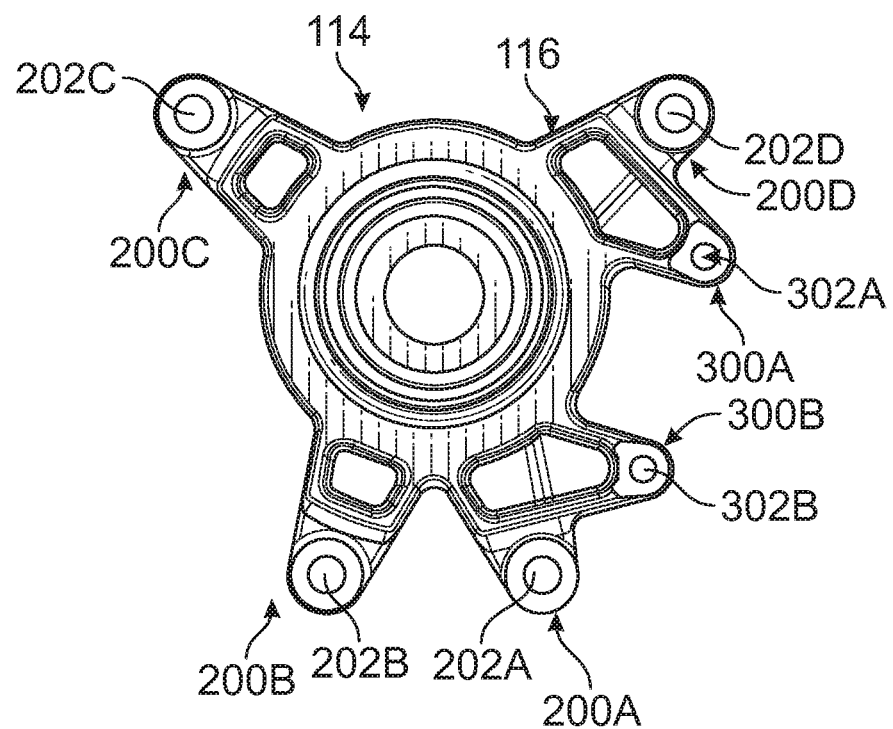
FIG. 3A illustrates a side view of a motor housing, in accordance with an example implementation.

FIG. 3A illustrates a side view of the motor housing 114, in accordance with an example implementation. As depicted in FIG. 3A, in addition to the mounting ears 200A-200D, the mounting flange 116 further includes two caliper mounting ears 300A, 300B that are cast into the motor housing 114 along with the mounting ears 200A-200D. The caliper mounting ear 300A includes a hole 302A and the caliper mounting ear 300B includes a hole 302B. Respective fasteners or bolts can be mounted through the holes 302A-302B to couple brake calipers to the disk 204.

As depicted in FIG. 3A, the caliper mounting ears 300A, 300B are adjacent to and share a base portion of the mounting flange 116 with the mounting ears 200D and 200A, respectively. Further, the caliper mounting ears 300A, 300B protrude at particular angles such that orientation of the caliper mounting ears 300A, 300B and the spacing between the holes 302A and 302B correspond to respective holes of standard brake calipers. This way, standard brake calipers (e.g., Ausco mechanical calipers) can be mounted to the mounting flange 116 of the motor housing 114.

Figure 3B:
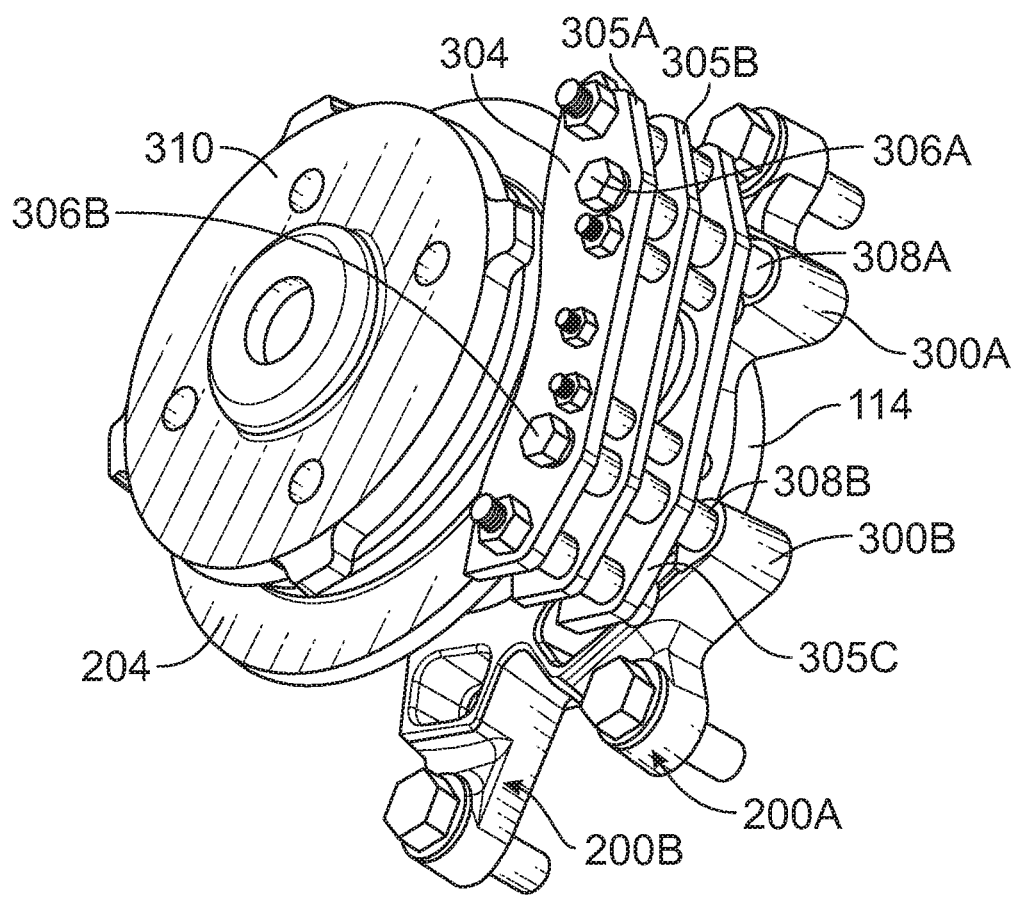
FIG. 3B illustrates a brake caliper assembly mounted to a disk, in accordance with an example implementation.

FIG. 3B illustrates a brake caliper assembly 304 mounted to the disk 204, in accordance with an example implementation. The brake caliper assembly 304 can have a plurality of calipers, such as calipers 305A, 305B, and 305C mounted about the disk 204. The calipers 305A, 305B can include or be coupled to brake pads configured to clamp, and apply friction forces, on the disk 204.

As shown in FIG. 3B, the caliper mounting ears 300A, 300B allow for direct attachment or mounting of brake mounting bolts 306A, 306B, respectively, through the caliper mounting ears 300A, 300B. The brake mounting bolts 306A, 306B couple the calipers 305A, 305B, and 305C of the brake caliper assembly 304 to the caliper mounting ears 300A, 300B of the motor housing 114 without using additional brackets.

Guide sleeves 308A, 308B are configured to fit over or about the brake mounting bolts 306A, 306B, respectively. The guide sleeves 308A, 308B can be interposed and clamped between the caliper 305C and the caliper mounting ears 300A, 300B, respectively.

The brake caliper assembly 304 is configured to float freely along longitudinal axes of the brake mounting bolts 306A, 306B and the guide sleeves 308A, 308B. However, the brake caliper assembly 304 is constrained in a distal axial direction by a caliper constraining disk 310. As mentioned above, with this configuration, no additional brackets are needed to mount the brake caliper assembly 304 to the disk 204 or the motor housing 114.

Figure 4A:
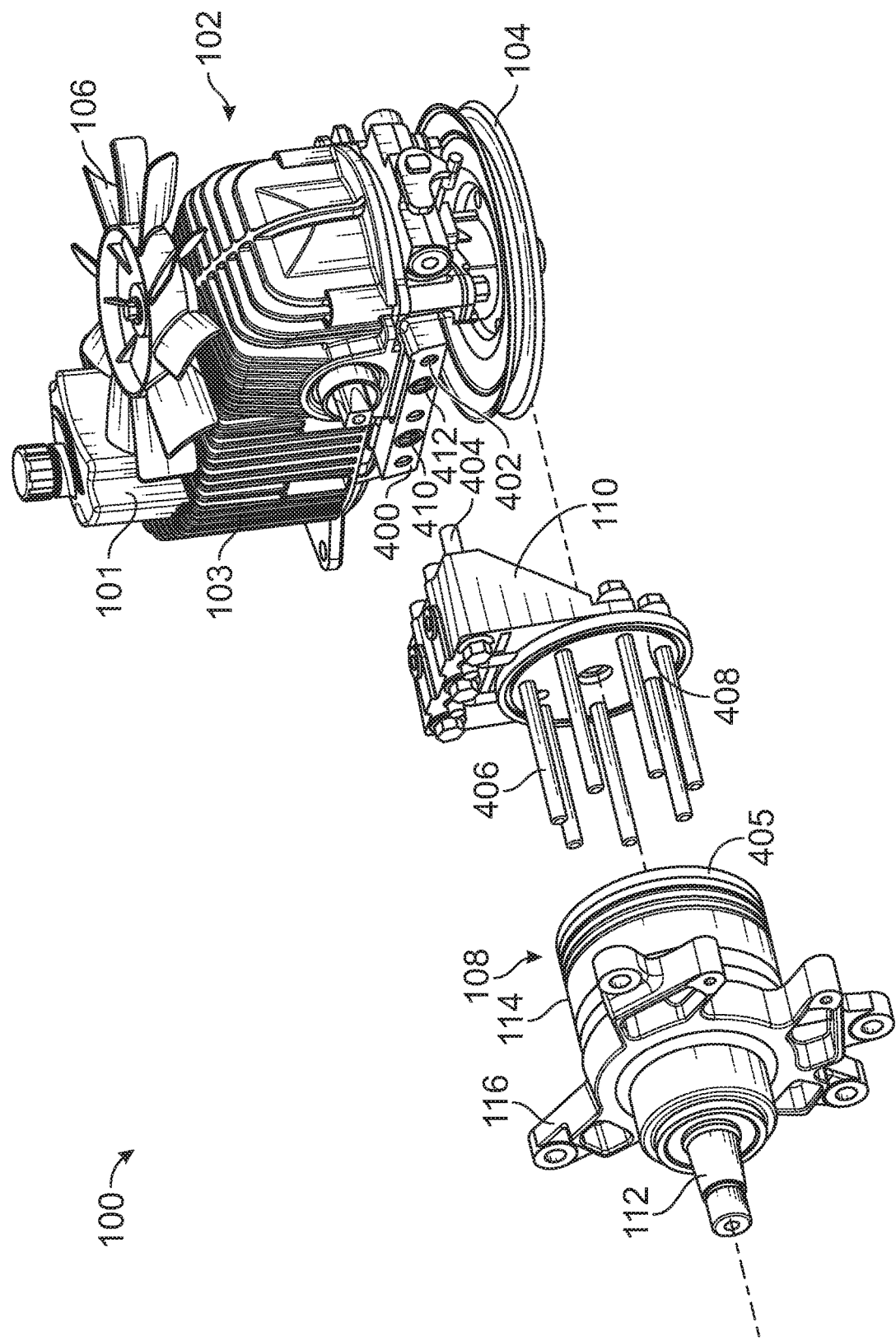
FIG. 4A illustrates an exploded view of the hydrostatic transmission shown in FIG. 1, in accordance with an example implementation.

FIG. 4A illustrates an exploded view of the hydrostatic transmission 100, in accordance with an example implementation. The interface block 110 is configured to couple the pump section 102 to the motor section 108. Particularly, the pump section 102 has a pump interface 400 having several holes, such as hole 402, configured to receive respective bolts or fasteners therethrough. The interface block 110 has a corresponding interface having respective holes through which pump-side bolts, such as pump-side bolt 404, are disposed. The pump-side bolts (e.g., pump-side bolt 404) are inserted into the holes (e.g., the hole 402) in the pump interface 400 to couple the pump section 102 to the interface block 110. With this configuration, the interface block 110 provides for structural support for the pump section 102.

Similarly, the motor section 108 has a motor interface 405 having a plurality of holes configured to receive motor-side bolts, such as motor-side bolt 406, protruding from a motor-side interface 408 of the interface block 110. The motor-side interface 408 has a plurality of holes through which the motor-side bolts (e.g., the motor-side bolt 406) are disposed. The motor-side bolts (e.g., motor-side bolt 406) are inserted into the holes in the motor interface 405 to couple the motor section 108 to the interface block 110. With this configuration, the interface block 110 locates or designates location of the shaft 112 with respect to the pump section 102.

The configuration shown in FIGS. 1 and 4A enables the motor section 108 to become a modular component of the hydrostatic transmission 100. Particularly, different motors of different sizes can interface with the same pump section, e.g., the pump section 102, by replacing the motor section 108 with a different motor section that interfaces with the interface block 110 coupled to the pump section 102. This way, the pump section 102 can be used to drive different motors of different sizes and capacities suitable for different products.

Further, the interface block 110 provides porting (e.g., fluid paths) between the pump section 102 and the motor section 108. As shown in FIG. 4A, the pump interface 400 includes a first pump port 410 configured to provide pressurized fluid to a corresponding port in the interface block 110, and the interface block 110 then provides the pressurized fluid to the motor section 108. The pump interface 400 further includes a second pump port 412 configured to receive fluid returning from the motor section 108 through another corresponding port in the interface block 110. The returning fluid then flows to the reservoir 101 through fluid paths in the interface block 110 and the pump section 102. The first pump port 410 and the second pump port 412 can be interchangeable, i.e., can either provide pressurized or receive returning fluid.

Figure 4B:
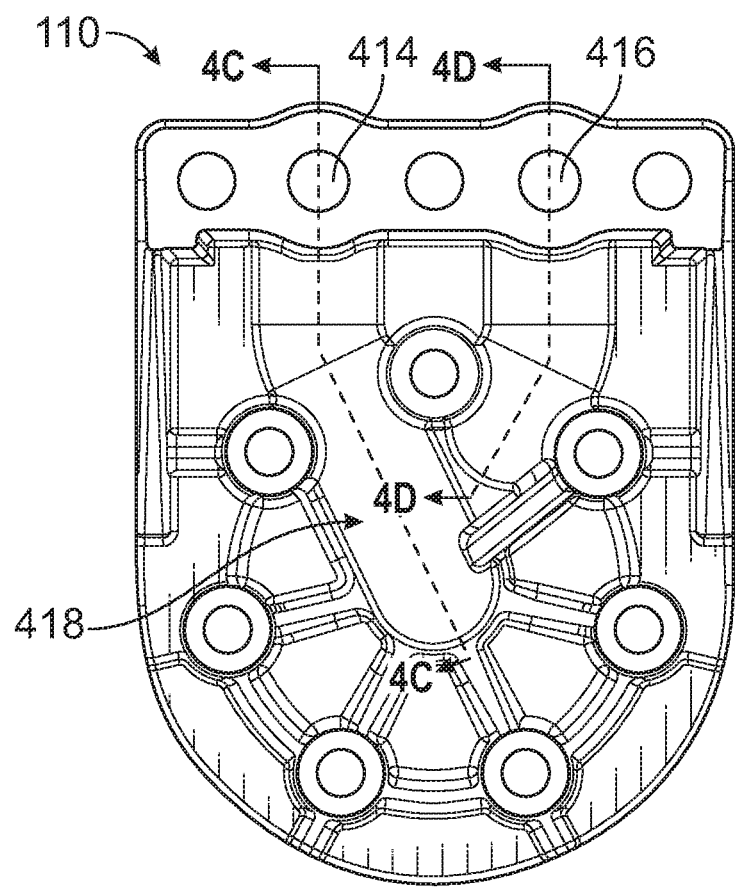
FIG. 4B illustrates a cross-sectional side view of an interface block, in accordance with an example implementation.
Figure 4C:
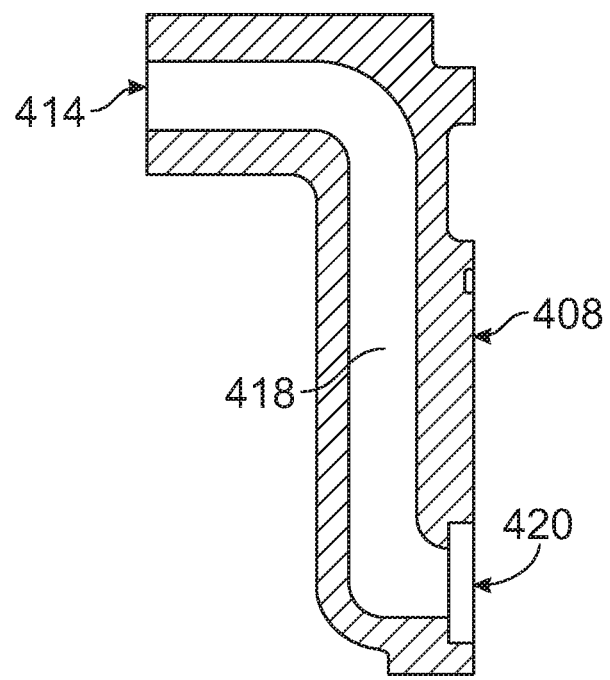
FIG. 4C illustrates cross section A-A labelled in FIG. 4B, in accordance with an example implementation.
Figure 4D:
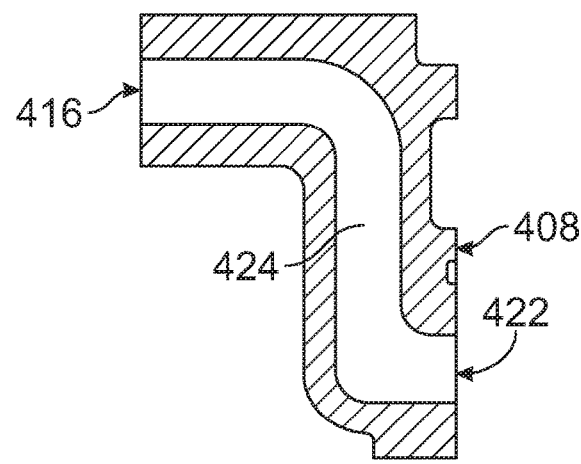
FIG. 4D illustrates cross section B-B labelled in FIG. 4B, in accordance with an example implementation

FIG. 4B illustrates a cross-sectional side view of the interface block 110, FIG. 4C illustrates cross section A-A labelled in FIG. 4B, and FIG. 4D illustrates cross section B-B labelled in FIG. 4B, in accordance with an example implementation. As shown in FIG. 4B, the interface block 110 includes a port 414 disposed in a pump-side interface 415, where the port 414 corresponds, and is and fluidly coupled, to the first pump port 410 of the pump interface 400. The interface block 110 further includes a port 416 disposed in a pump-side interface 415, where the port 416 corresponds, and is and fluidly coupled, to the second pump port 412 of the pump interface 400.

Fluid received at the port 414 is then communicated through a first internal fluid passage 418 shown in FIGS. 4B-4C to an opening 420 in the motor-side interface 408 as shown in FIG. 4C. The opening 420 is fluidly coupled to the motor section 108 to provide fluid to the motor section 108. Fluid returning from the motor section 108 is communicated to an opening 422 (shown in FIG. 4D) in the motor-side interface 408 of the interface block 110 and is then communicated through a second internal fluid passage 424 to the port 416.

With the configuration of FIGS. 4A-4D, the interface block 110 provides internal flow paths for fluid flow between the pump section 102 and the motor section 108. Some conventional hydrostatic transmissions include a circular end cover that does not include internal flow paths. In these conventional hydrostatic transmissions, extra pipes or hoses are used to fluidly couple the motor section to the pump section, thereby adding to the cost of the hydrostatic transmission and reducing reliability due to the extra components and potential leak points. Other conventional hydrostatic transmissions have an end cover integrated with a pump end block, and the pump end block is configured with fluid paths, thereby requiring more expensive end blocks with complex casting cores. With the configuration of FIGS. 1 and 4A-4D, no extra pipes or hoses are required. Further, the internal flow paths are disposed in the interface block 110, thereby enabling the pump section 102 to have less complex casting cores compared to some conventional hydrostatic transmissions.

Figure 4E:
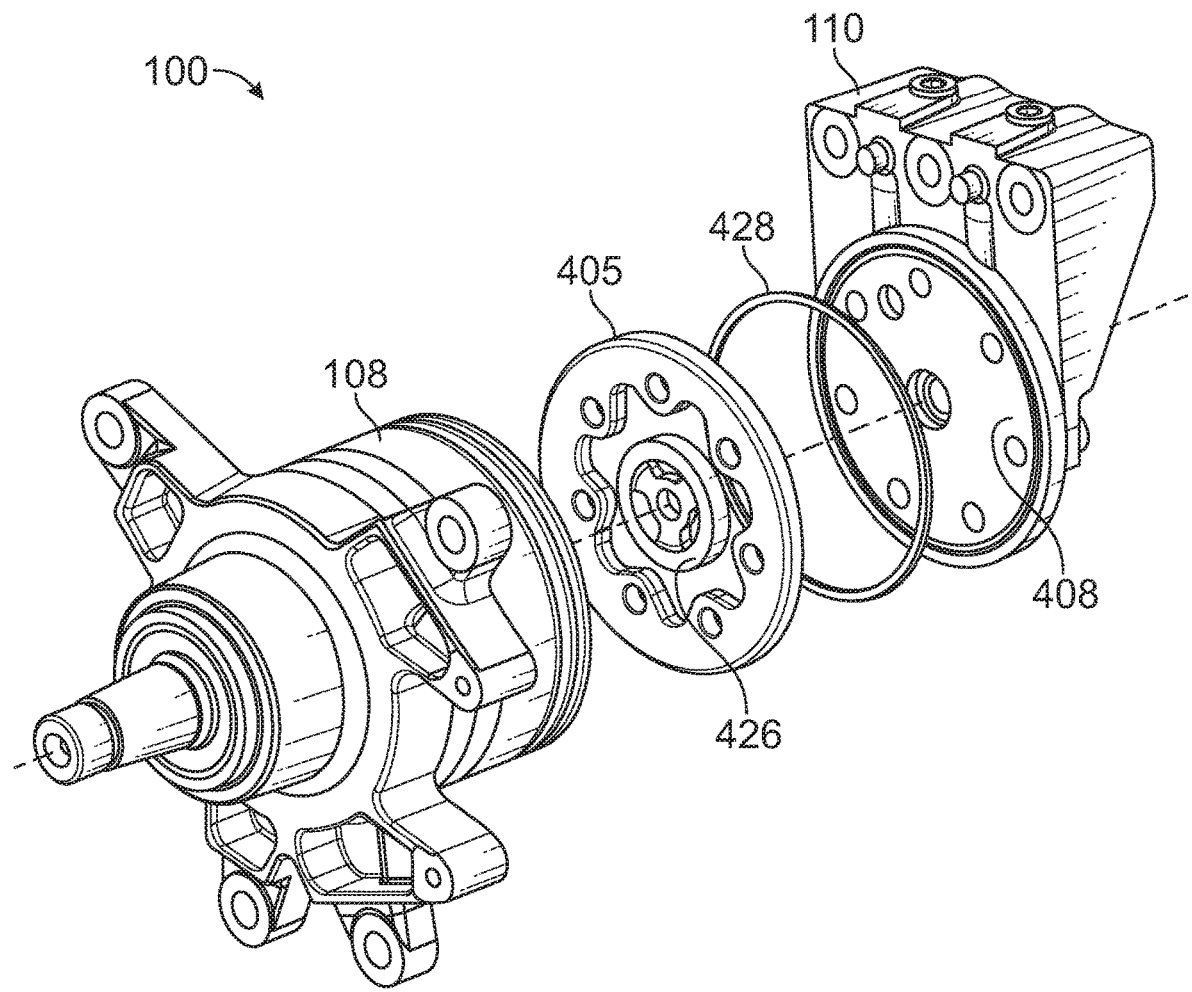
FIG. 4E illustrates another exploded view of the interface block shown in FIG. 4B and a motor section, in accordance with an example implementation.

FIG. 4E illustrates another exploded view of the interface block 110 and the motor section 108, in accordance with an example implementation. The hydrostatic transmission 100 can further include an orbiting valve element or orbiting commutator 426 configured as the motor interface 405. The orbiting commutator 426 is configured to rotate with the rotating group of components of the motor section 108 and the shaft 112. As the orbiting commutator 426 rotates, it provides or distributes fluid to pistons of the motor section 108 in a particular sequence to operate the motor section 108. Advantageously, the motor-side interface 408 of the interface block 110 operates as a running surface for the orbiting commutator 426 (e.g., the motor-side interface 408 provides a surface against which the orbiting commutator 426 slides as it orbits within the motor section 108). A commutator seal 428 is configured to preclude fluid leakage around edges of the motor-side interface 408.

Figure 5:
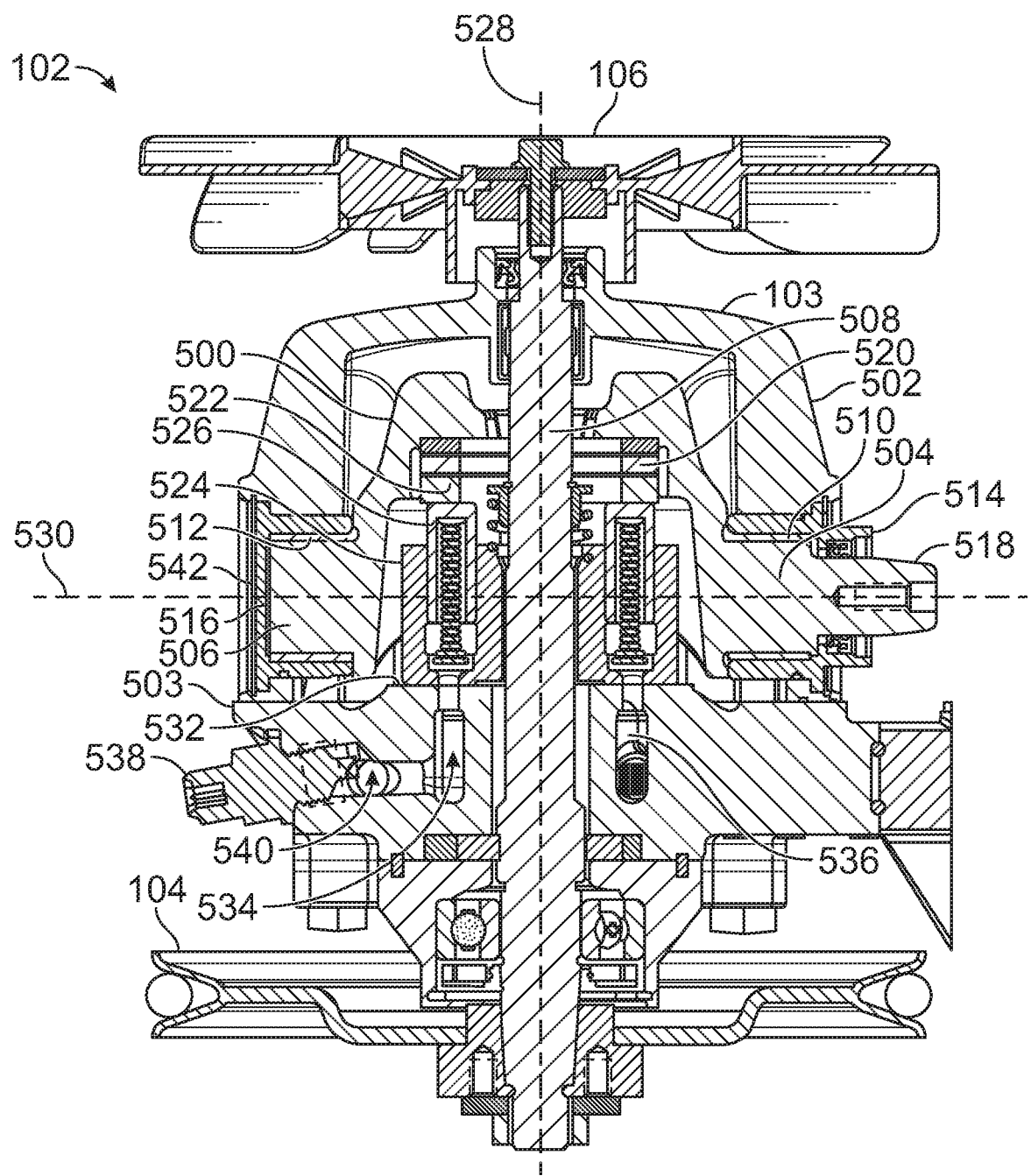
FIG. 5 illustrates a partial cross section of a pump section having a trunnion-mounted swash block, in accordance with an example implementation.

FIG. 5 illustrates a partial cross section of the pump section 102 having a trunnion-mounted swash block 500, in accordance with an example implementation. The housing 103 of the pump section 102 can be a horizontally-split housing, where the housing 103 is divided into a first or top housing portion 502 and a second or bottom housing portion 503. As depicted in FIG. 5, the trunnion-mounted swash block 500 is a single-piece configuration that is supported within the top housing portion 502 at both sides. The trunnion-mounted swash block 500 has, or is mounted to, two trunnion arms 504 and 506 extending on both sides therefrom.

The trunnion arms 504 and 506 are configured to be perpendicular to an input shaft 508 coupled to the pulley 104 and configured to rotate therewith. The trunnion arms 504 and 506 interface with two cylindrical support bushings 510 and 512, respectively. Specifically, an interior peripheral surface of the cylindrical support bushing 510 interfaces with an exterior peripheral surface of the trunnion arm 504, and an exterior peripheral surface of the cylindrical support bushing 510 interfaces with an interior peripheral surface of a first cylindrical trunnion arm cap 514. In this configuration, the cylindrical support bushing 510 and the trunnion arm 504 are mounted within an open annular space defined by the cylindrical trunnion arm cap 514.

Similarly, an interior peripheral surface of the cylindrical support bushing 512 interfaces with an exterior peripheral surface of the trunnion arm 506, and an exterior peripheral surface of the cylindrical support bushing 512 interfaces with an interior peripheral surface of a second cylindrical trunnion arm cap 516. In this configuration, the cylindrical support bushing 512 and the trunnion arm 506 are mounted within a respective open annular space defined by the cylindrical trunnion arm cap 516. The top housing portion 502 includes trunnion bushing bores configured to receive the cylindrical trunnion arm caps 514 and 516, respectively, and facilitate mounting the trunnion-mounted swash block 500 to the top housing portion 502.

The cylindrical trunnion arm cap 514 is configured to allow a control arm 518 coupled to the trunnion arm 504 to protrude or extend outwardly from the trunnion-mounted swash block 500. As such, the cylindrical trunnion arm cap 514 can be referred to as the control arm cap. On the other hand, the cylindrical trunnion arm cap 516 has a blind side as the trunnion arm 506 does not protrude outwardly from the top housing portion 502. As such, the cylindrical trunnion arm cap 516 can be referred to as the blank side cap.

An input lever (not shown) can be coupled to an end of the control arm 518. With this configuration, as the input lever is rotated, the control arm 518, the trunnion arm 504, and the trunnion-mounted swash block 500 rotate relative to the input shaft 508. The trunnion-mounted swash block 500 rotates while being supported on both sides via the trunnion arms 504 and 506.

As shown in FIG. 5, the trunnion-mounted swash block 500 is configured to receive a thrust bearing 520 and a swash plate 522 coupled thereto. The pump section 102 also includes a pump piston-and-barrel assembly 524 configured to house a plurality of piston(s) 526 secured against and engaging with the swash plate 522. The pump piston-and-barrel assembly 524 and the piston(s) 526 are configured to rotate with the input shaft 508.

In a neutral position, the swash plate 522 is perpendicular to a longitudinal axis 528 of the input shaft 508. In this neutral position, the piston(s) 526 do not reciprocate within the pump piston-and-barrel assembly 524 as they rotate about and with the input shaft 508, and fluid might not be provided from the pump section 102 to the motor section 108. If the input lever coupled to the control arm 518 is rotated, the trunnion-mounted swash block 500 and the swash plate 522 rotate about a longitudinal axis 530 of the trunnion arms 504 and 506, where the longitudinal axis 530 is perpendicular to the longitudinal axis 528 of the input shaft 508. In such rotated position, the piston(s) 526 reciprocate within the pump piston-and-barrel assembly 524 as they rotate about the input shaft 508. Different rotation angles change respective strokes of the piston(s) 526, resulting in different amounts of fluid flow generated from the pump section 102. The stroke of a piston of the piston(s) 526 may be defined as an extent of linear travel of the piston within its pump piston-and-barrel assembly 524.

As the pump piston-and-barrel assembly 524 rotates about the longitudinal axis 528, the pump piston-and-barrel assembly 524 slides against a pump running face 532. The pump running face 532 can include one or more holes or openings through which fluid is withdrawn from the reservoir 101 into longitudinal bores in which the piston(s) 526 reciprocates. The pump running face 532 can also include one or more holes or openings through which fluid is provided from the longitudinal bores toward passage in fluid communication with the interface block 1110.

Particularly, as the pump piston-and-barrel assembly 524 rotates about the longitudinal axis 528, fluid is withdrawn from the reservoir 101. As the piston(s) 526 reciprocate, the piston(s) 526 pressurize the fluid, and the pressurized fluid is then provided to the interface block 110 and then to the motor section 108 as described above with respect to FIGS. 4A-4E. Fluid communication between the pump section 102 and the interface block 110 can take place via fluid passages such as internal fluid passages 534 and 536 disposed in the housing 103 (e.g., in the bottom housing portion 503) and shown in FIG. 5.

The hydrostatic transmission 100 can include oil temperature monitoring devices to monitor temperature and internal oil condition within the hydrostatic transmission 100. For example, as shown in FIG. 5, a temperature sensor 538 can be mounted to an internal fluid passage 540 fluidly coupled to the internal fluid passage 534. The temperature sensor 538 is thus subjected to fluid in the internal fluid passage 534 and can be configured to monitor the temperature of hydraulic oil in the internal fluid passage 534. Hydraulic oil in the internal fluid passage 534 can be oil that is circulating through the various components of the hydrostatic transmission 100. After a period of running, the temperature of the hydraulic oil circulating through the hydrostatic transmission 100 can become uniform, and thus measuring the temperature within the internal fluid passage 534 can be indicative of oil temperature throughout the hydrostatic transmission 100.

The temperature sensor 538 can be configured to provide sensor information indicative of measurements of the temperature of hydraulic oil in the internal fluid passage 534 to an onboard processing unit or a controller of a machine that includes the hydrostatic transmission 100, for example. Based on the oil temperature indicated by the sensor information, the controller can determine the remaining useful oil life period during which the hydraulic oil can still be used effectively in the hydrostatic transmission 100. Elongated operation of oil at high temperatures can degrade the hydraulic oil. The controller can monitor temperatures of the oil over time and durations that the hydrostatic transmission 100 operates at temperatures exceeding a particular temperature threshold, and then accordingly determine the remaining useful life. When the controller determines that the oil has degraded to a level that reduces its effectiveness or can cause damage to other components of the hydrostatic transmission 100, the controller can provide maintenance alerts (e.g., through signals to an instrument panel) to a user of the machine to change the oil.

As shown in FIG. 5, the bottom housing portion 503 can have internal threads at an end of the internal fluid passage 540. The temperature sensor 538 in turn can have external threads configured to engage with the internal threads of the bottom housing portion 503 to couple the temperature sensor 538 to the internal fluid passage 540. Such configuration involving externally mounting the temperature sensor 538 to the housing 103 (e.g., the bottom housing portion 503) facilitates changing or maintaining the temperature sensor 538.

In some cases, users of the hydrostatic transmission 100 may overfill the reservoir 101 when performing maintenance. If overflowing oil or leaking oil is allowed to drain towards the fan 106, the oil may create an undesirable environmental condition with oil spray and disbursement. Beneficially, the hydrostatic transmission 100 is configured to direct overflowing oil away from the fan 106 to preclude dispersing the oil by the fan 106, as described next.

Figure 6A:
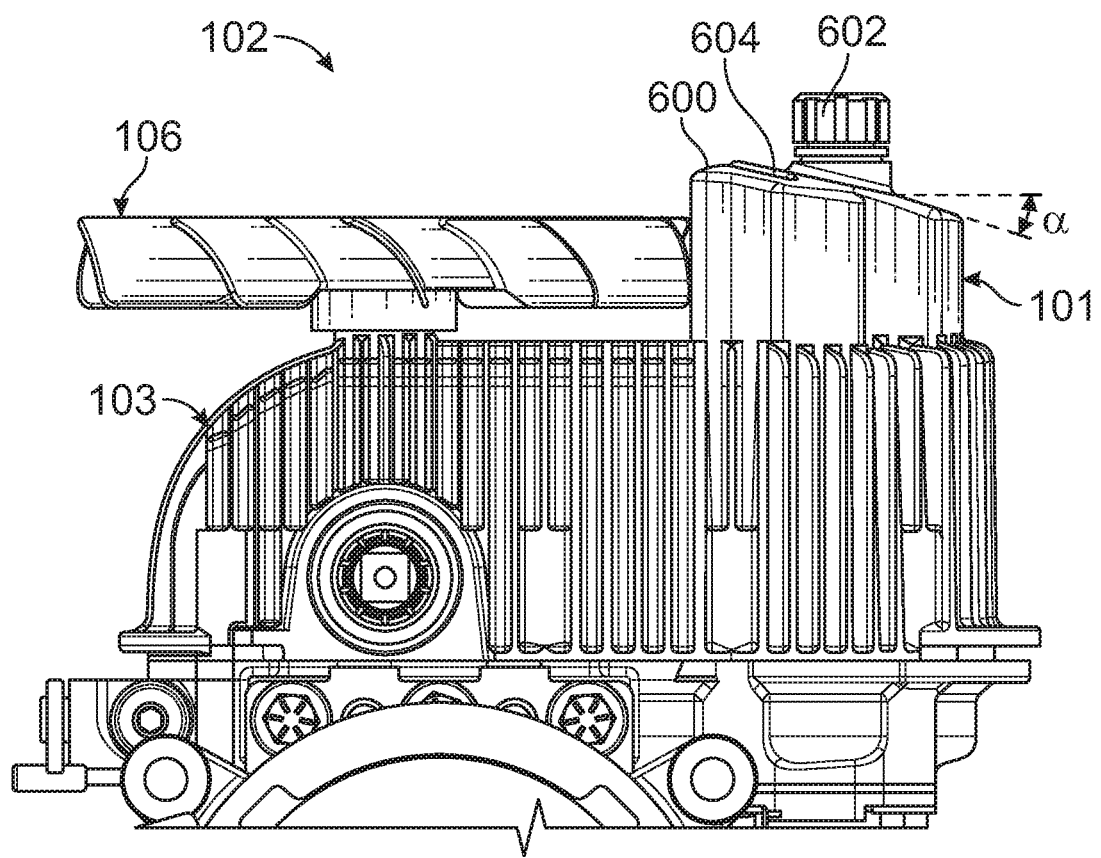
FIG. 6A illustrates a partial view of a pump section, in accordance with an example implementation.

FIG. 6A illustrates a partial view of the pump section 102, in accordance with an example implementation. As shown in FIG. 6A a top surface 600 of the reservoir 101 is inclined at an angle α. If the reservoir 101 is overfilled and oil leaks around a cap 602 covering and configured to seal the oil filling opening of the reservoir 101, oil can roll downward along the top surface 600. This way, oil is funneled away from the fan 106. As such, the inclination of the top surface 600 assists with natural drainage of oil in a direction away from the fan 106.

Additionally or alternatively, the reservoir 101 can include a protrusion or ridge 604 disposed around an oil fill area. The ridge 604 can block fluid movement toward the fan 106, and additionally can channel the oil away from the fan 106.

Figure 6B:
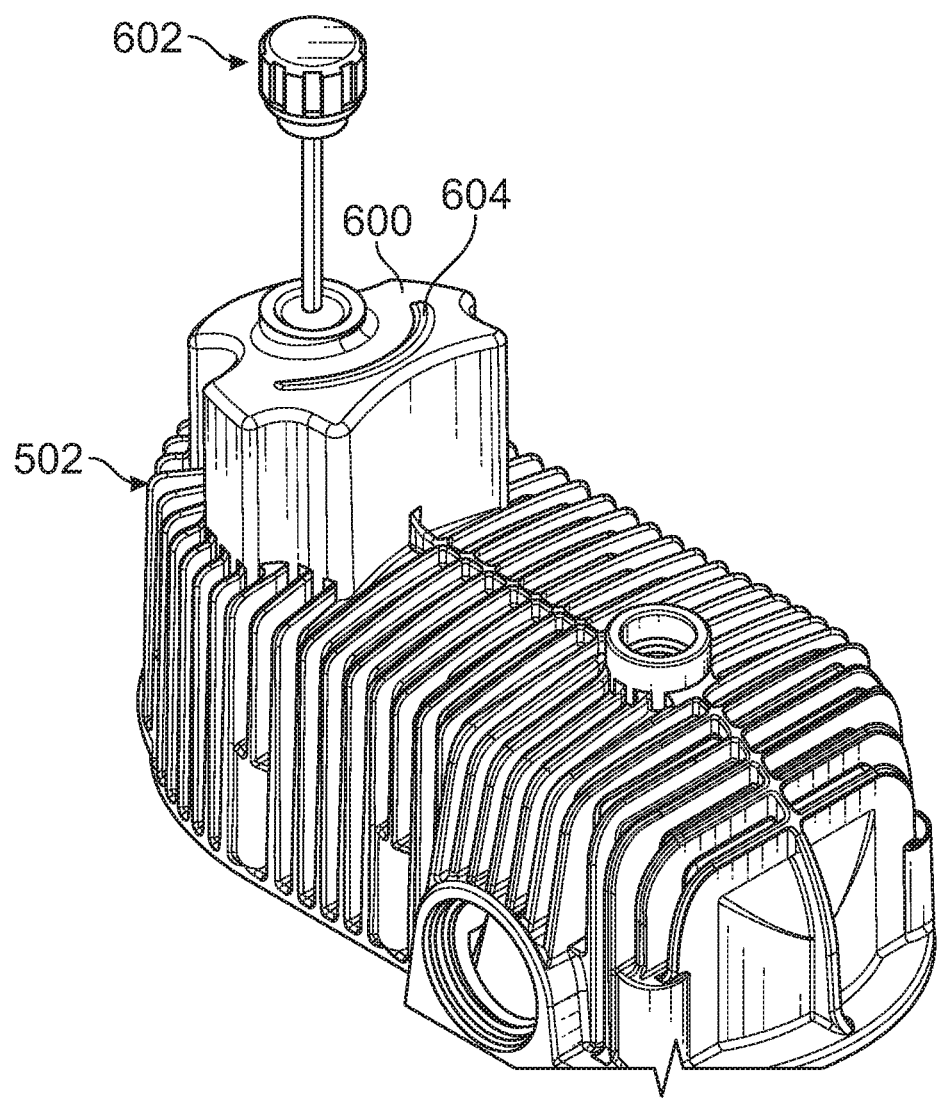
FIG. 6B illustrates a partial exploded view of a top housing portion and a reservoir, in accordance with an example implementation.

FIG. 6B illustrates a partial exploded view of the top housing portion 502 and the reservoir 101, in accordance with an example implementation. As depicted in FIG. 6B, the ridge 604 is arcuate in shape. As such, any oil drained around the cap 602 and moving toward the ridge 604 may be precluded from going further toward the fan 106 by virtue of the ridge 604 being raised or extended upward from the top surface 600 of the reservoir 101. Further, oil or oil drops can roll about a boundary of the ridge 604 toward its ends, which direct the oil in a direction away from the fan 106. Thus, any oil draining around the cap 602 due to overfill can be funneled away from the fan 106 by virtue of the top surface 600 being inclined and by virtue of the ridge 604 being arcuate and raised or protruding upward from the top surface 600, thereby blocking oil from flowing toward the fan 106.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting. Also, the terminology used herein is for the purpose of describing particular implementations only, and is not intended to be limiting.

What is claimed is:

1. A hydrostatic transmission comprising:
   a motor section having a motor interface;
   a pump section configured to generate fluid flow, wherein the pump section comprises a pump interface having a first pump port to provide fluid flow therethrough and a second pump port to receive returning fluid flow therethrough; and
   an interface block coupled to the motor interface and coupled to the pump interface so as to couple the pump section to the motor section, wherein the interface block comprises:
      a pump-side interface configured to mate with the pump interface, wherein the pump-side interface comprises: a first port fluidly coupled to the first pump port and a second port fluidly coupled to the second pump port,
      a motor-side interface configured to mate with the motor interface of the motor section, wherein the motor-side interface comprises a first opening configured to provide fluid to the motor section and a second opening configured to receive fluid returning from the motor section, wherein the motor-side interface is parallel to the pump-side interface,
      a first internal fluid passage configured to fluidly couple the first port to the first opening, and
      a second internal fluid passage configured to fluidly couple the second opening to the second port.

2. The hydrostatic transmission of claim 1, wherein the motor section includes an orbiting commutator configured to distribute fluid received via the first opening of the motor-side interface to pistons disposed in the motor section, wherein the motor-side interface of the interface block is configured as a running face against which the orbiting commutator slides.

3. The hydrostatic transmission of claim 1, wherein the motor section comprises a motor housing, wherein the motor housing comprises a mounting flange having a plurality of mounting ears protruding radially outward from the motor housing, wherein each mounting ear includes a hole configured to receive a fastener therethrough so as to couple the motor section to a frame of a vehicle to be propelled by the hydrostatic transmission.

4. The hydrostatic transmission of claim 3, wherein the plurality of mounting ears comprises four mounting ears.

5. The hydrostatic transmission of claim 3, wherein the motor housing further comprises two caliper mounting ears, each caliper mounting ear having a respective hole configured to receive a respective fastener therethrough so as to couple a plurality of brake calipers to the motor section.

6. The hydrostatic transmission of claim 5, wherein the two caliper mounting ears are disposed in the mounting flange of the motor housing, such that each caliper mounting ears is adjacent a respective mounting ear of the plurality of mounting ears of the mounting flange.

7. The hydrostatic transmission of claim 1, wherein the pump section includes a housing, wherein the housing comprises a fluid passage fluidly coupled to another fluid passage through which fluid flows, and wherein the hydrostatic transmission further includes:
 a temperature sensor mounted to the housing and fluidly coupled to the fluid passage, such that the temperature sensor is subjected to fluid circulating through the hydrostatic transmission and is configured to provide sensor information indicative of a temperature of the fluid.

8. The hydrostatic transmission of claim 1, further comprising:
 a housing;
 a reservoir configured to contain fluid; and
 a fan disposed adjacent to the reservoir and configured to reduce a temperature of the housing, wherein the reservoir has a top surface that is inclined at a particular angle, such that fluid disposed at the top surface is directed down along the top surface away from the fan.

9. The hydrostatic transmission of claim 8, wherein the reservoir includes a ridge disposed on the top surface and protruding outward from the top surface to block fluid movement toward the fan, wherein the ridge is arcuate in shape.

10. A hydrostatic transmission comprising:
 a motor section having a motor interface, wherein the motor section comprises a motor housing, wherein the motor housing comprises two caliper mounting ears, each caliper mounting ear having a respective hole configured to receive a respective fastener therethrough so as to couple a plurality of brake calipers to the motor section;
 a pump section configured to generate fluid flow, wherein the pump section comprises a pump interface; and
 an interface block coupled to the motor interface and coupled to the pump interface so as to couple the pump section to the motor section, wherein the interface block comprises internal fluid passages for fluidly coupling the pump section to the motor section.

11. The hydrostatic transmission of claim 10, wherein the motor housing further comprises a mounting flange having a plurality of mounting ears protruding radially outward from the motor housing, wherein each mounting ear includes a hole configured to receive a fastener therethrough so as to couple the motor section to a frame of a vehicle to be propelled by the hydrostatic transmission.

12. The hydrostatic transmission of claim 11, wherein the two caliper mounting ears are disposed in the mounting flange of the motor housing, such that each caliper mounting ears is adjacent a respective mounting ear of the plurality of mounting ears of the mounting flange.

13. The hydrostatic transmission of claim 10, wherein the pump interface comprises a first pump port to provide fluid flow therethrough and a second pump port to receive returning fluid flow therethrough, wherein the interface block comprises:
 a pump-side interface configured to mate with the pump interface, wherein the pump-side interface comprises: a first port fluidly coupled to the first pump port and a second port fluidly coupled to the second pump port, and
 a motor-side interface configured to mate with the motor interface of the motor section, wherein the motor-side interface comprises a first opening configured to provide fluid to the motor section and a second opening configured to receive fluid returning from the motor section, wherein the internal fluid passages comprise: a first internal fluid passage configured to fluidly couple the first port to the first opening, and a second internal fluid passage configured to fluidly couple the second opening to the second port.

14. A hydrostatic transmission comprising:
 a motor section having a motor interface;
 a pump section configured to generate fluid flow, wherein the pump section comprises a pump interface and a housing, wherein the housing comprises a fluid passage;
 a temperature sensor mounted to the housing of the pump section and fluidly coupled to the fluid passage, such that the temperature sensor is subjected to fluid circulating through the hydrostatic transmission and is configured to provide sensor information indicative of a temperature of the fluid; and
 an interface block coupled to the motor interface and coupled to the pump interface so as to couple the pump section to the motor section, wherein the interface block comprises internal fluid passages for fluidly coupling the pump section to the motor section.

15. The hydrostatic transmission of claim 14, wherein the motor section comprises a motor housing, wherein the motor housing comprises a mounting flange having a plurality of mounting ears protruding radially outward from the motor housing, wherein each mounting ear includes a hole configured to receive a fastener therethrough so as to couple the motor section to a frame of a vehicle to be propelled by the hydrostatic transmission.

16. The hydrostatic transmission of claim 15, wherein the motor housing further comprises two caliper mounting ears, each caliper mounting ear having a respective hole configured to receive a respective fastener therethrough so as to couple a plurality of brake calipers to the motor section.

17. The hydrostatic transmission of claim 16, wherein the two caliper mounting ears are disposed in the mounting flange of the motor housing, such that each caliper mounting ears is adjacent a respective mounting ear of the plurality of mounting ears of the mounting flange.

18. A hydrostatic transmission comprising:
 a motor section having a motor interface;
 a pump section configured to generate fluid flow, wherein the pump section comprises a pump interface and a housing;
 a reservoir configured to contain fluid;
 a fan disposed adjacent to the reservoir and configured to reduce a temperature of the housing, wherein the reservoir includes a ridge disposed on a top surface of the reservoir and protruding outward from the top surface to block fluid movement toward the fan; and an interface block coupled to the motor interface and coupled to the pump interface so as to couple the pump section to the motor section, wherein the interface block comprises internal fluid passages for fluidly coupling the pump section to the motor section.

19. The hydrostatic transmission of claim 18, wherein the ridge is arcuate in shape.

20. The hydrostatic transmission of claim 18, wherein the pump interface comprises a first pump port to provide fluid flow therethrough and a second pump port to receive returning fluid flow therethrough, wherein the interface block comprises:

a pump-side interface configured to mate with the pump interface, wherein the pump-side interface comprises: a first port fluidly coupled to the first pump port and a second port fluidly coupled to the second pump port, and a motor-side interface configured to mate with the motor interface of the motor section, wherein the motor-side interface comprises a first opening configured to provide fluid to the motor section and a second opening configured to receive fluid returning from the motor section, wherein the internal fluid passages comprise: a first internal fluid passage configured to fluidly couple the first port to the first opening, and a second internal fluid passage configured to fluidly couple the second opening to the second port.

* * * * *